April 15, 1924.
S. STEIN
1,490,885
CIGAR AND CIGARETTE HOLDER
Filed Sept. 20, 1922
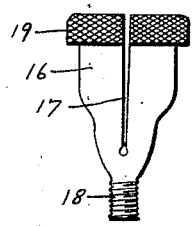
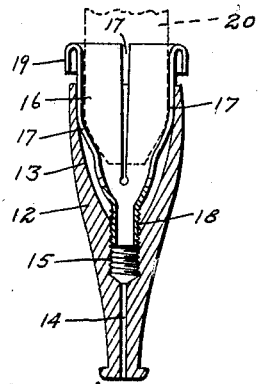
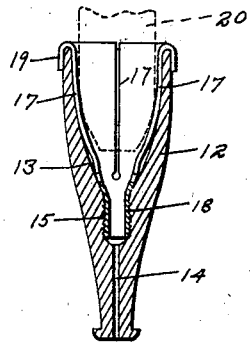
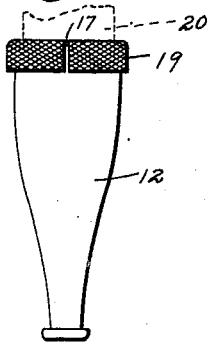
Inventor:
Samuel Stein
Atty's.

Patented Apr. 15, 1924.

1,490,885

UNITED STATES PATENT OFFICE.

SAMUEL STEIN, OF BOSTON, MASSACHUSETTS, ASSIGNOR OF ONE-HALF TO LOUIS E. MURAN, OF BOSTON, MASSACHUSETTS.

CIGAR AND CIGARETTE HOLDER.

Application filed September 20, 1922. Serial No. 589,324.

*To all whom it may concern:*

Be it known that I, SAMUEL STEIN, a citizen of the United States, residing at Boston, in the county of Suffolk and State of Massachusetts, have invented new and useful Improvements in Cigar and Cigarette Holders, of which the following is a specification.

This invention is embodied in a two-part cigar or cigarette holder, which includes a rigid mouthpiece, having a bore extending continuously through it from end to end, and a shell having a screw-thread engagement with the mouthpiece, and formed to receive the inner end of an article such as a cigar or a cigarette, said shell being provided with a grip portion, whereby it may be rotated to force it into the mouthpiece, and adapted to be contracted on said end by the mouthpiece, and thereby firmly secure the article to the holder.

Of the accompanying drawings forming a part of this specification,—

Figure 1 is a side view of the part of the holder called the shell.

Figure 2 is a longitudinal section, showing both parts of the holder before the shell is contracted.

Figure 3 is a view similar to Figure 2, showing the shell contracted.

Figure 4 is a side view of the holder in the condition shown by Figure 3.

The same reference characters indicate the same parts in all of the figures.

In the drawings, 12 represents a rigid tubular mouthpiece, constituting one of the parts of a two-part holder, and having an enlarged bowl and a contracted stem. The mouthpiece has a bore extending continuously through it from end to end and including a flaring outer portion 13, a contracted inner portion 14, and a threaded intermediate portion or socket 15. A tubular sheet metal shell constitutes the other part of the holder, and includes an outer bowl portion 16, which is split by slots 17, preferably four in number, extending from its outer end partly to its inner end, and a screw-threaded tubular stem portion 18, constituting the inner end of the shell, and adjustably engaged with the socket 15.

The bowl portion 16, is formed to receive an end portion of an article 20, such as a cigar or a cigarette, and is so flared or tapered that when the shank 18 is screwed into the socket 15, the wall of the bore portion 13 contracts the portion 16, and causes it to slightly compress and firmly grasp the inserted end of the article. The bowl portion 16 is provided with a substantially annular grip portion 19, here shown as a lip or flange 19, bent backwardly from the outer end of the bowl portion 16 and forming an annular grip, adapted to be grasped by a finger and thumb to rotate the shell when the stem portion 18 is being screwed into, or out of the socket 15.

The lip may be externally knurled, or otherwise roughened, to provide a frictional surface, and is preferably spaced outward from the portion 16, so that when the shank is fully entered in the socket, the lip embraces or overlaps the outer end of the mouthpiece.

The holder shown by the drawings is proportioned to hold a cigar. It may, of course, be proportioned to hold a cigarette.

I claim:

1. A cigar-holder comprising a mouthpiece having an enlarged bowl and a contracted stem and having a bore extending continuously from end to end of the mouthpiece, said bore being enlarged within the bowl, and having a contracted portion within the stem, and an intermediate screw-threaded portion; and a tubular shell having a threaded tubular stem adapted to be screwed into said intermediate bore portion, said shell having a split bowl portion formed to receive a cigar end, and adapted to be contracted by the tapered bore portion of the mouth-piece when the shell stem is screwed into the threaded bore portion, and an external substantially annular grip portion whereby the shell may be rotated.

2. A cigar holder substantially as specified by claim 1, said grip portion being a lip bent backwardly from the outer end of the bowl of the shell, and adapted to overlap the outer end of said mouthpiece bowl.

In testimony whereof I have affixed my signature.

SAMUEL STEIN.